US008874416B2

(12) United States Patent
Vepa et al.

(10) Patent No.: US 8,874,416 B2
(45) Date of Patent: Oct. 28, 2014

(54) PROCESS TOOL CHEMICAL AND GAS USAGE OPTIMIZATION (75) Inventors: Krishna Vepa, Livermore, CA (US); Parris C. M. Hawkins, Los Altos, CA (US); Andreas Neuber, Stuttgart (DE)

(73) Assignee: Applied Materials, Inc., Santa Clara, CA (US)

(*) Notice: Subject to any disclaimer, the term of this patent is extended or adjusted under 35 U.S.C. 154(b) by 266 days.

(21) Appl. No.: 13/308,124

(22) Filed: Nov. 30, 2011

(65) Prior Publication Data
US 2012/0143574 A1     Jun. 7, 2012

Related U.S. Application Data (60) Provisional application No. 61/418,336, filed on Nov. 30, 2010.

(51) Int. Cl.
*G06G 7/48* (2006.01)
*G05B 19/418* (2006.01)
*G06Q 10/04* (2012.01)

(52) U.S. Cl.
CPC .. *G05B 19/4187* (2013.01); *G06B 2219/45031* (2013.01); *G06Q 10/04* (2013.01)
USPC .......................................................... 703/6

(58) Field of Classification Search
USPC .......................................................... 703/6
See application file for complete search history.

(56) References Cited

U.S. PATENT DOCUMENTS

| | | | | |
|---|---|---|---|---|
| 5,748,478 A | * | 5/1998 | Pan et al. | 700/99 |
| 6,912,438 B2 | * | 6/2005 | Choo et al. | 700/121 |
| 2004/0005780 A1 | * | 1/2004 | Ma et al. | 438/691 |
| 2007/0054045 A1 | | 3/2007 | Hou | |
| 2008/0132042 A1 | | 6/2008 | Li et al. | |
| 2011/0010215 A1 | * | 1/2011 | Lin et al. | 705/8 |

OTHER PUBLICATIONS

Nag; Yield Forecasting (PhD thesis); Carnegie Mellon University; 1996; 208 pages.*
Nag et al.; Simulation of Yield/Cost Learning Curves with Y4; IEEE TRANS. Semiconductor Manufacturing, vol. 10, No. 2, 1997; pp. 256-266.*
Wong: A Statistical Parametric and Probe Yield Analysis Methodology; IEEE; 1996; pp. 131-139.*
Iwata et al.; Simple Cost Models of High-Process-Mix Wafer Fabs at Different Capacities; IEEE Trans. Semiconductor Manufacturing, vol. 15, No. 2, 2002; 267-273.*
Wright: Cost Resource Model (CRM); Talk: Economic Model Workshop, Philadelphia; 2001; pp. 1-22.*
Blundo et al.; Selecting Proper Chamber-Cleaning Processes for Installed Base CVD tools; MICRO, Oct./Nov. 2005; pp. 1-7.*
Srinivasan et al.: Correlation Between Yield and Waiting Time: A Quantitative Study; 1995 IEEE/CPMT Int'l Electronics Manufacturing Technology Symposium; pp. 65-69.*
Lin et al.; Damage-Free Cryogenic Aerosol Clean Processes; IEEE TRANS. Semiconductor Manufacturing, vol. 20, No. 2, May 2007; pp. 101-106.*
Raoux et al.; Remote microwave plasma source for cleaning chemical vapor deposition chambers: Technology for reducing global warming gas emissions: Journal of Vacuum Science & Technology B 17, 477-485+cover sheet (1999).*

* cited by examiner

*Primary Examiner* — Hugh Jones
(74) *Attorney, Agent, or Firm* — Blakely, Sokoloff, Taylor & Zafman LLP (57) ABSTRACT A resource usage optimization server determines a degradation caused by a first resource. The resource usage optimization server determines a cleaning caused by a second resource. The resource usage optimization server calculates a ratio of the degradation and the cleaning.

20 Claims, 8 Drawing Sheets

PROCESS TOOL CHEMICAL AND GAS USAGE OPTIMIZATION

RELATED APPLICATION

This application is related to and claims the benefit of U.S. Provisional Patent application Ser. No. 61/418,336, filed Nov. 30, 2010, which is hereby incorporated by reference.

TECHNICAL FIELD

Embodiments of the present invention relate to factory optimization, and more specifically to optimizing chemical and gas usage for process tools in the factory.

BACKGROUND OF THE INVENTION

Nanomanufacturing factories purchase and make extensive use of processing materials, such as chemicals and gases. A multiple phase process performed by a process tool in a factory may include the use of processing materials that affect or degrade the process tool, followed by the use of processing materials that recondition or clean the process tool. Process tools may be operated conservatively to insure the cleaning or reconditioning of the process tools is complete. Excessive amounts of the processing materials used to clean or recondition the process tools may be used, thereby wasting the processing materials. Process tool time may also be wasted as the cleaning or reconditioning may take longer to perform with the excessive amounts of processing materials. As a result, a manufacturer may be overspending when purchasing the processing materials and losing process tool time that could instead be used for additional processing, as well as wasting precious natural resources and adding to increased global warming.

BRIEF DESCRIPTION OF THE DRAWINGS

The present invention is illustrated by way of example, and not by way of limitation, in the figures of the accompanying drawings and in which.

DETAILED DESCRIPTION

Embodiments of the invention are directed to a method and system for process tool resource usage optimization. A resource usage optimization server determines a degradation caused by a first resource. The resource usage optimization server determines a cleaning caused by a second resource. The resource usage optimization server calculates a ratio of the degradation and the cleaning.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "identifying", "comparing", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relates to an apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of the invention as described herein.

A machine-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Figure 1:
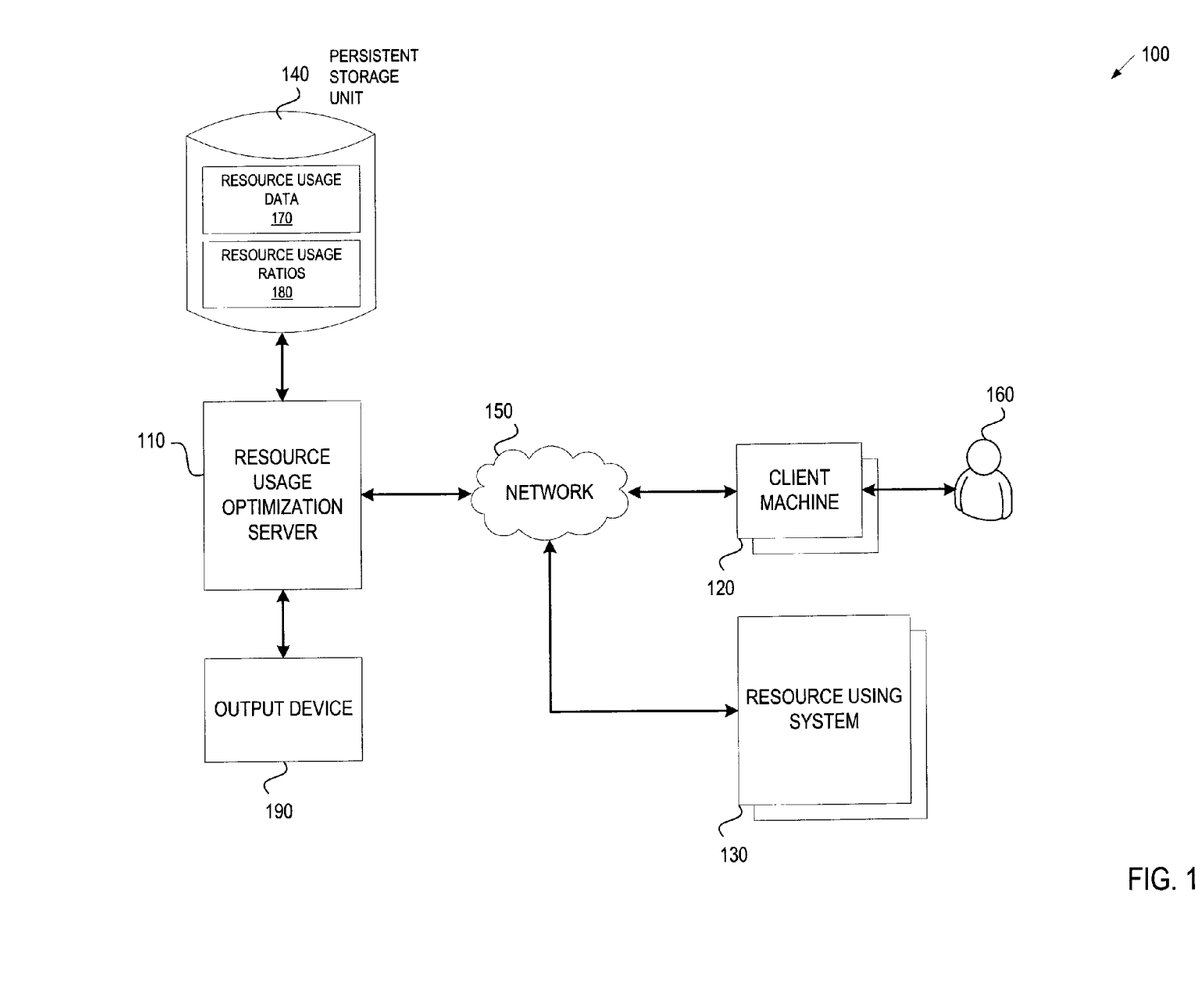
FIG. 1 illustrates an exemplary network architecture on which embodiments of the present invention may be implemented.

FIG. 1 illustrates an exemplary network architecture 100 on which embodiments of the present invention may be implemented. In one embodiment, network architecture 100 uses client-server architecture. In this embodiment, one or more resource usage optimization client machines 120 can communicate over network 150 with a central server, such as resource usage optimization server 110, to access resource usage optimization data 170 stored on persistent storage unit 140. In an alternate embodiment, a resource usage optimization apparatus can be a server 110 residing in a factory coupled locally to one or more resource using systems 130. In one embodiment, the resource usage optimization server 110 and resource using systems 130 can be maintained by a factory administrator. In this embodiment, the resource usage optimization server 110 can connect to the resource using systems 130 directly or indirectly via a hardware interface (not shown).

The resource usage optimization server 110 can be hosted by any type of computing device including desktop computers, laptop computers, handheld computers or similar computing device. Client machines 120 can be hosted by any type of computing device including desktop computers, laptop computers, mobile communications devices, cell phones, smart phones, handheld computers or similar computing device. The network 150 can be a local area network (LAN), such as an intranet within a company, a wireless network, a mobile communications network, a wide area network (WAN), such as the Internet or similar communication system. The network 150 can include any number of networking and computing devices such as wired and wireless devices.

A factory (e.g., a factory in the semiconductor, PV, display, MEMS, nanomanufacturing, glass and web, etc. industries) purchases and makes extensive use of resources, such as processing materials. The resources may be consumed by manufacturing tools (e.g., process tools) such as resource using systems 130. Examples of the manufacturing tools include tools for the manufacture of electronic devices (e.g., etchers, chemical vapor deposition furnaces, etc.) or of a type for manufacturing other products. Examples of resources include process chemicals (e.g., deposition chemicals and cleaning chemicals) and gases (e.g., deposition gases and cleaning gases). The resource usage optimization server 110 can collect resource usage data 170 from the resource using systems 130 (e.g., manufacturing tools) over network 150. Resource usage data 170 can include usage of a degradation resource by the resource using systems 130 and usage of a cleaning resource by the resource using systems 130. The resource usage optimization server 110 can calculate one or more ratios using resource usage data 170 to generate one or more resource usage ratios 180. The resource usage optimization server 110 can store the resource usage data 170 and resource usage ratios 180 in a persistent storage unit 140. The persistent storage unit 140 can be a local storage unit or a remote storage unit. The persistent storage unit 140 can be a magnetic storage unit, optical storage unit, solid state storage unit or similar storage unit. The persistent storage unit 140 can be a monolithic device or a distributed set of devices. A 'set,' as used herein, refers to any positive whole number of items including one.

The resource usage optimization server 110 can output resource usage data 170 or resource usage ratios 180 to one or more client machines 130 accessible by one or more users 160. For example, the resource usage optimization server 110 can generate graphical user interfaces (GUIs) to display resources for user selection, resource usage data 170, or resource usage ratios 180 accessible by client machines 120. The resource usage optimization server 110 can also send an email message and/or text message regarding the resource usage data 170 or resource usage ratios 180 to client machines 120 accessible by users 160. The resource usage optimization server 110 can also output resource usage data 170 or resource usage ratios 180 to an output device 190 (e.g., display unit, printer) coupled to the resource usage optimization server 110.

Figure 2:
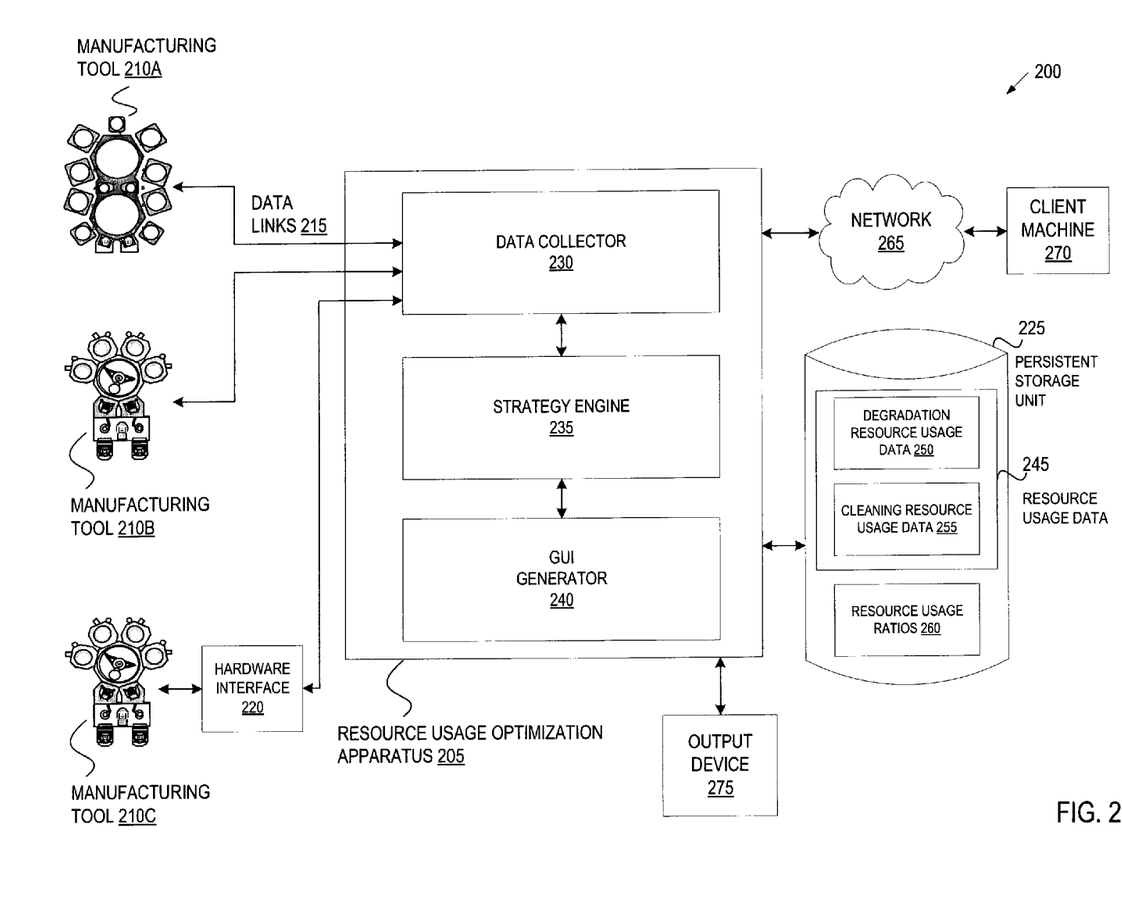
FIG. 2 illustrates an embodiment of a chemical or gas usage optimization system.

FIG. 2 illustrates one embodiment of a resource usage optimization system 200 for optimizing resource usage for process tools. In one embodiment, the resource usage optimization system 200 can be used to monitor the manufacturing of electronic devices. The electronic devices can be manufactured in a factory using nanomanufacturing technology and can include, for example, the manufacture of semiconductors, solar, display, LED, etc. Manufacturing such devices generally includes dozens of manufacturing steps involving different types of manufacturing processes and resources. The manufacturing processes generally use a first resource to manufacture a device in a process chamber and a second resource to clean the process chamber once the device has been manufactured.

The resource usage optimization system 200 can include a resource usage optimization apparatus 205, resource using systems (e.g., one or more manufacturing tools 210A,B,C), and a persistent storage unit 225. The resource usage optimization apparatus 205 can be hosted by any type of computing device including desktop computers, laptop computers, handheld computers or similar computing device. The resource usage optimization apparatus 205 can be a server (e.g., resource usage optimization server 110 in FIG. 1) coupled to manufacturing tools 210A,B,C. In another embodiment, the resource usage optimization apparatus 205 can be a client machine. The resource usage optimization apparatus 205 can connect directly to manufacturing tools 210A,B,C by data communication links 215 (e.g., EDI direct connection links), via a network (not shown), via a hardware interface 220, or a combination thereof.

The resource usage optimization system 200 can include all manufacturing tools 210A,B,C in a factory or only some manufacturing tools 210A,B,C in the factory. Each of the manufacturing tools 210A,B,C can be a tool for the manufacture of electronic devices (e.g., etchers, chemical vapor deposition furnaces, etc.) or of a type for manufacturing other products. Examples of manufacturing tools 210A,B,C include process tools for manufacturing 300 mm and 200 mm wafer technology. Each manufacturing tool 210A,B,C (process tools) can include multiple sensors (not shown) for monitoring processes run on the manufacturing tool 210A,B,C. Examples of types of sensors include flow meters that monitor the amount of processing materials used by a manufacturing process run by the manufacturing tools 210A,B,C.

The resource usage optimization apparatus 205 can include a data collector 230, strategy engine 235, and GUI generator 240. This division of functionality is presented by way example for sake of clarity. One skilled in the art would understand that the functionality described could be combined into a monolithic component or sub-divided into any combination of components. Data collector 230, strategy engine 235, and GUI generator 240 can be hosted on a single computer system, on separate computer systems, or a combination thereof.

The data collector 230 can collect resource usage data 245 from manufacturing tools 210A,B,C to determine the usage rate for a resource (e.g., chemicals, gases) used by the manufacturing tools 210A,B,C. In one embodiment, resource usage data 245 includes degradation resource usage data 250 and cleaning resource usage data 255. Degradation resource usage data 250 can include the usage data for a degradation resource (processing material) used in a process. Cleaning resource usage data 255 can include the usage data for a cleaning resource (processing material) used in a process.

System 200 can store the resource usage data 245 (including degradation resource usage data 250 and cleaning resource usage data 255) in a persistent storage unit 225.

The strategy engine 235 can use the resource usage data 245 to generate a resource usage ratio for a manufacturing tool 210A,B,C using the degradation resource and the cleaning resource. The ratio can be generated by dividing a value of the cleaning resource usage data 255 for one of the manufacturing tools 210A,B,C by a value of the degradation resource usage data 250 for the manufacturing tool. System 200 can store the resource usage ratios 260 in persistent storage unit 225.

In one embodiment, the strategy engine 235 compares a generated resource usage ratio to a mean value of resource usage ratios 260 or to a predetermined value (e.g., 1) for the resource usage ratio. The strategy engine 235 can detect whether a deviation exists between the generated resource usage ratio and the mean or predetermined value for the ratio. In particular, the strategy engine 235 can detect whether the generated resource usage ratio is greater than the mean or predetermined value for the ratio.

The strategy engine 235 can further compare the deviation to a threshold to determine whether a process and/or a manufacturing tool 210A, B, C using the degradation and cleaning resources warrants further analysis. The threshold can be a user-defined threshold. The threshold can be stored in persistent storage unit 225 (not shown). For example, the strategy engine 235 may determine that the deviation is less than (or less than or equal to) the threshold and thus, the resource usage does not warrant further analysis. In another example, the strategy engine 235 may determine that the deviation is greater than (or greater than or equal to) the threshold and thus, identify the resource usage for further analysis.

The persistent storage unit 225 can store the resource usage data 245 and the resource usage ratios 260. The resource usage data 245 can include the degradation resource usage data 250 and the cleaning resource usage data 255.

Figure 4:
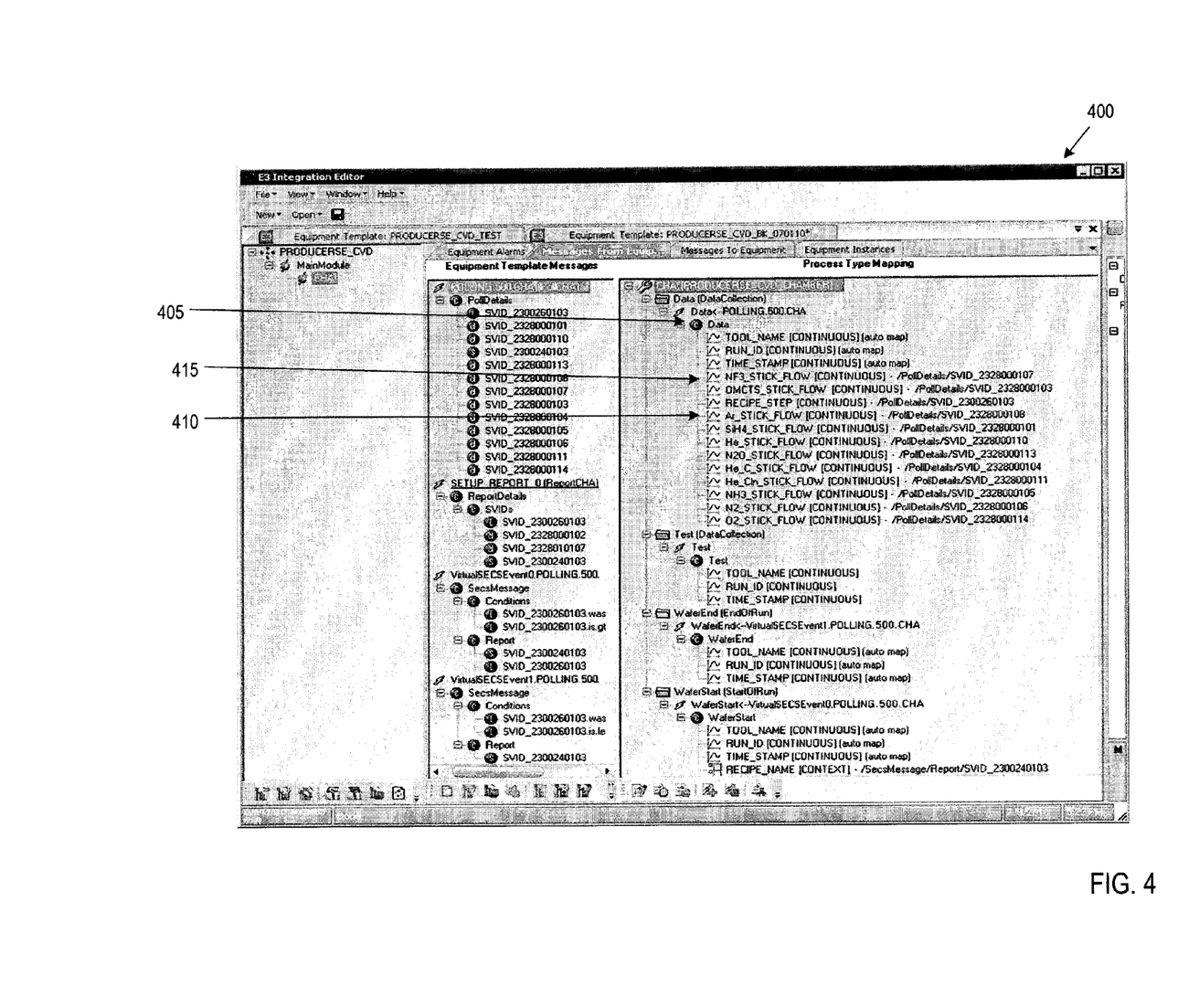
FIG. 4 illustrates an exemplary graphical user interface (GUI) to present one or more resources for user selection, in accordance with one embodiment of the invention.
Figure 5A:
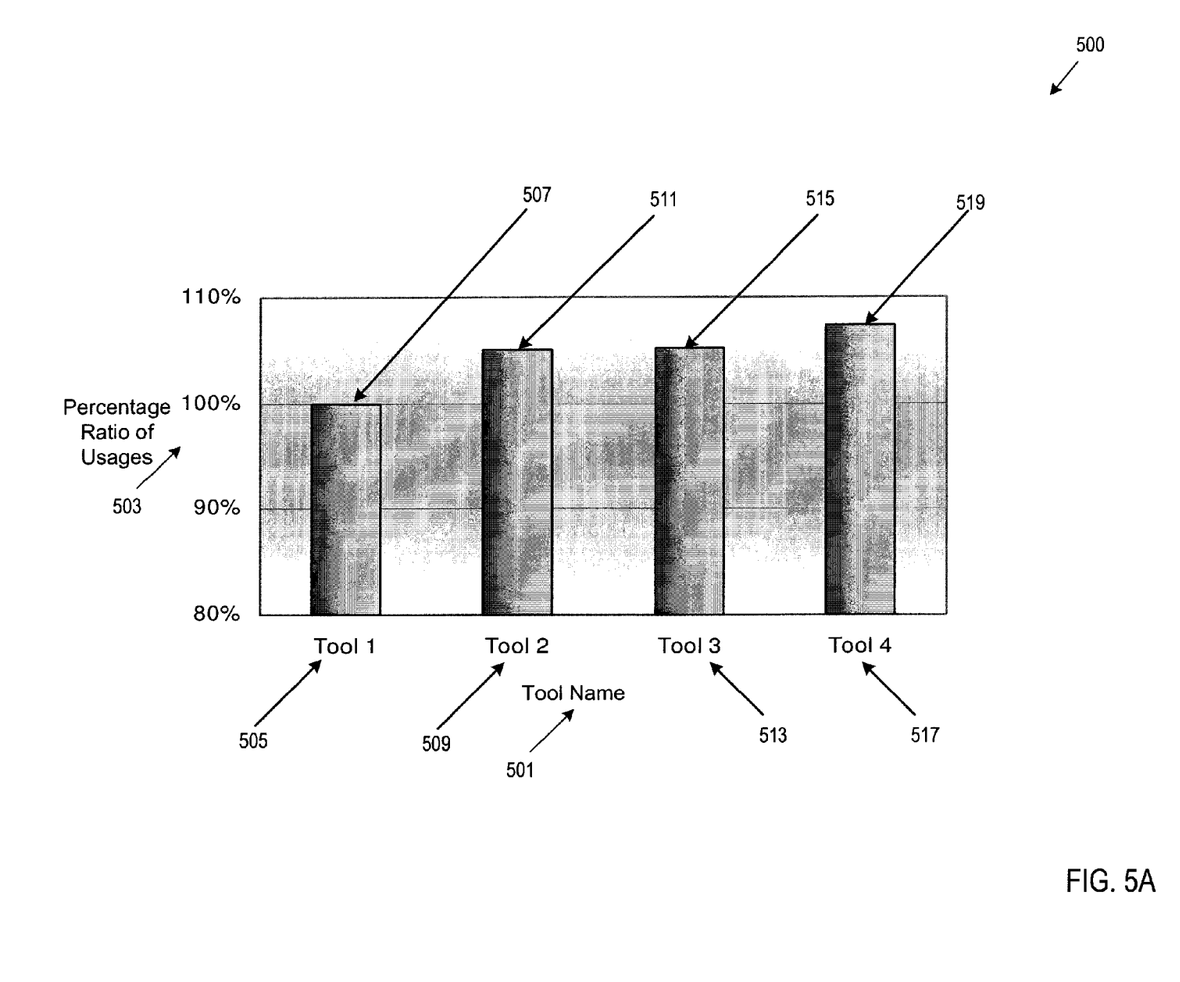
FIGS. 5A, 5B and 5C illustrate exemplary GUIs to enable usage optimization analysis for one or more resources.
Figure 5B:
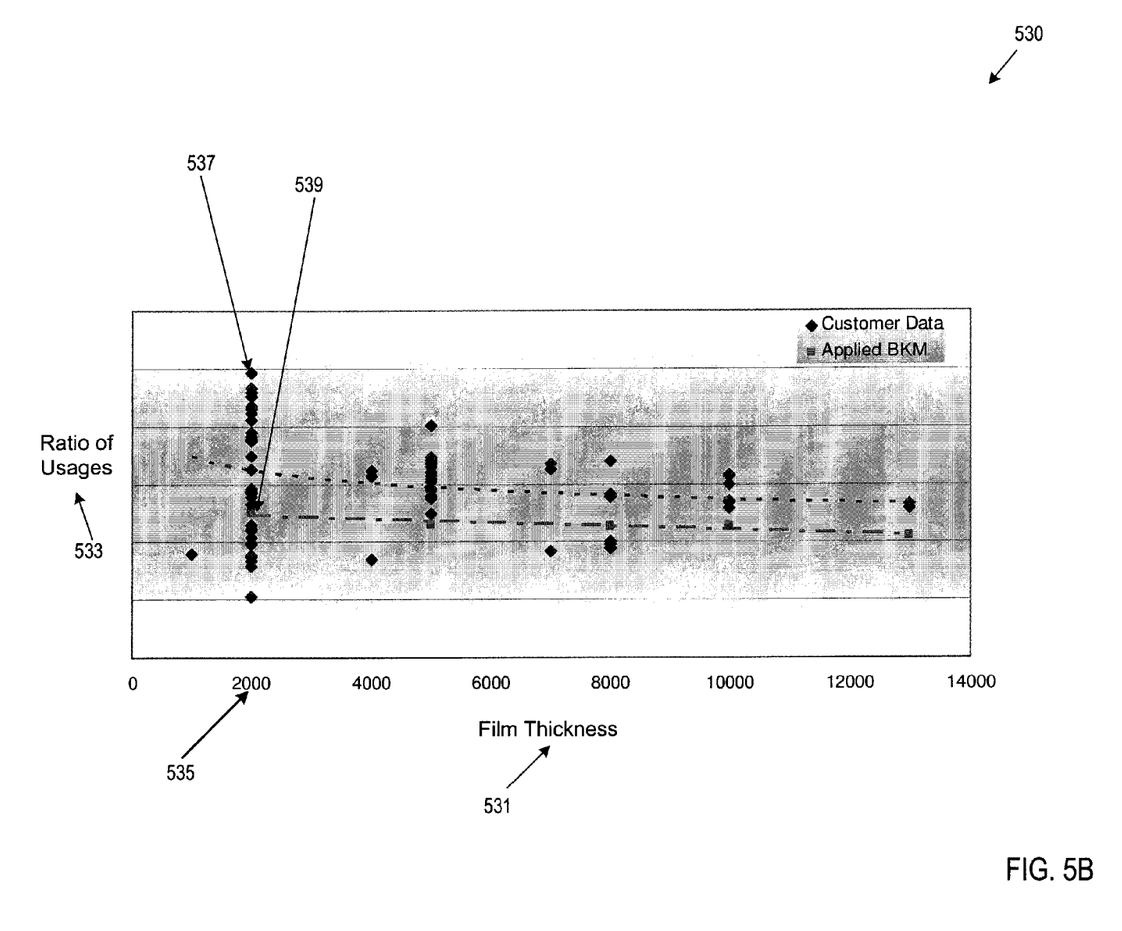
Figure 5C:
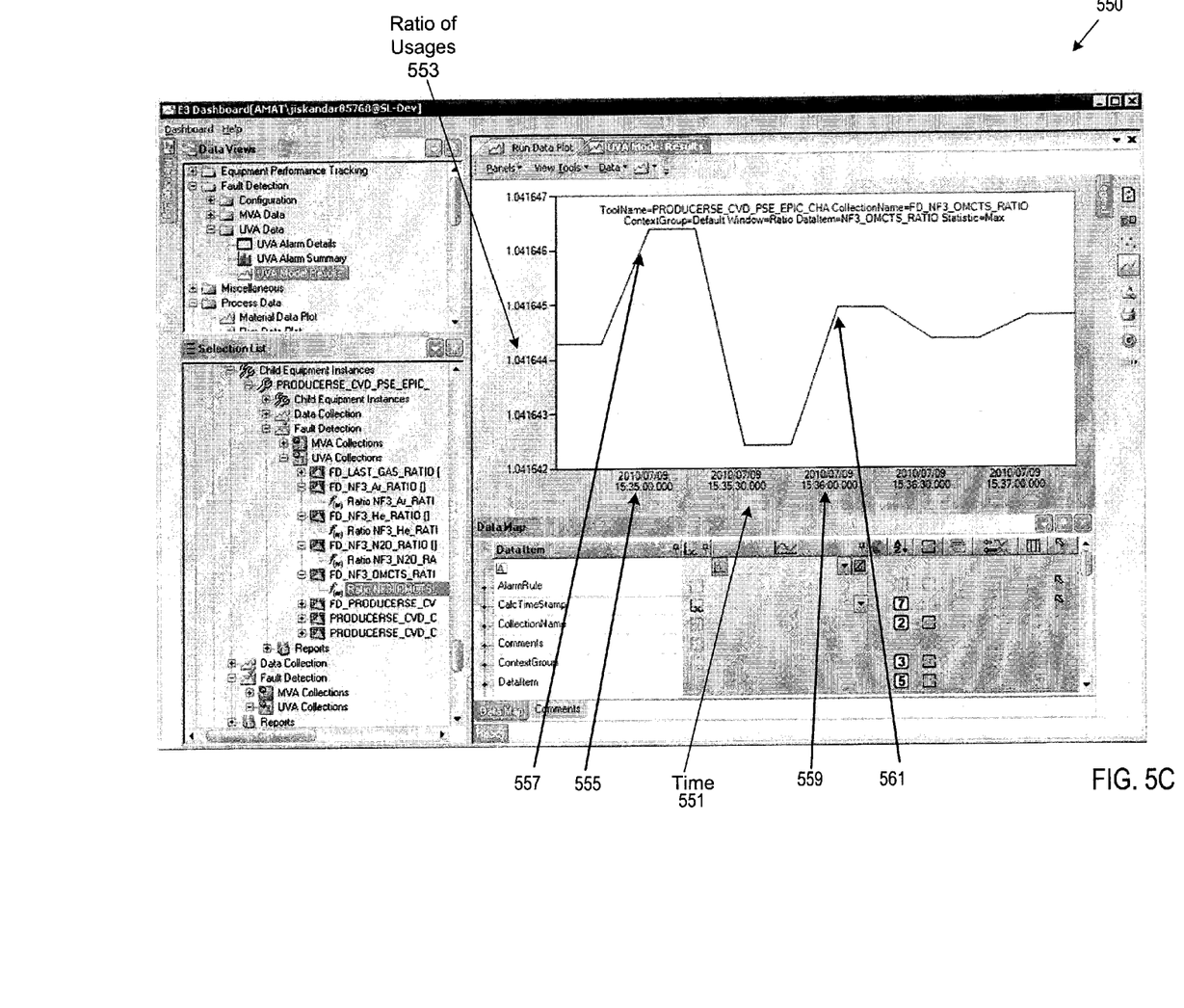

The GUI generator 240 can generate GUIs to illustrate the resources used in a process run by a manufacturing tool 210A,B,C that are available for selection. FIG. 4, described in greater detail below, illustrates an exemplary GUI for selection of resources. The GUI generator 240 can generate GUIs to illustrate the resource usage ratios 260. The GUI generator 240 can generate a GUI to graphically illustrate a process that warrants usage resource optimization. In particular, the GUI generator 240 can generate a GUI to illustrate that a process is using more of a cleaning resource than the process has previously used or that the process is using more of a cleaning resource than other manufacturing tools running the same process. The GUI generator 240 can also generate GUIs to illustrate resource usage data 245 collected from manufacturing tools 210A,B,C. FIGS. 5A-5C, described in greater detail below, illustrate exemplary GUIs for enabling resource usage optimization analysis. The GUIs generated by GUI generator 240 can be accessible via a browser on a client machine 270. Client machines 270 can be coupled to GUI generator 240 and resource usage optimization apparatus 205 via a network 265 or directly via a hardware interface (not shown). The network 265 can be a local area network (LAN), such as an intranet within a company, a wireless network, a mobile communications network, a wide area network (WAN), such as the Internet or similar communication system. The network 265 can include any number of networking and computing devices such as wired and wireless devices.

Client machines 270 can be hosted by any type of computing device including desktop computers, laptop computers, mobile communications devices, cell phones, smart phones, handheld computers or similar computing device. In one embodiment, the resource usage optimization apparatus 205 includes an output device 275 (e.g., display unit, printer). The resource usage optimization apparatus 205 can output the resource usage ratios 260 or the resource usage data 245 via the output device 275.

Figure 3:
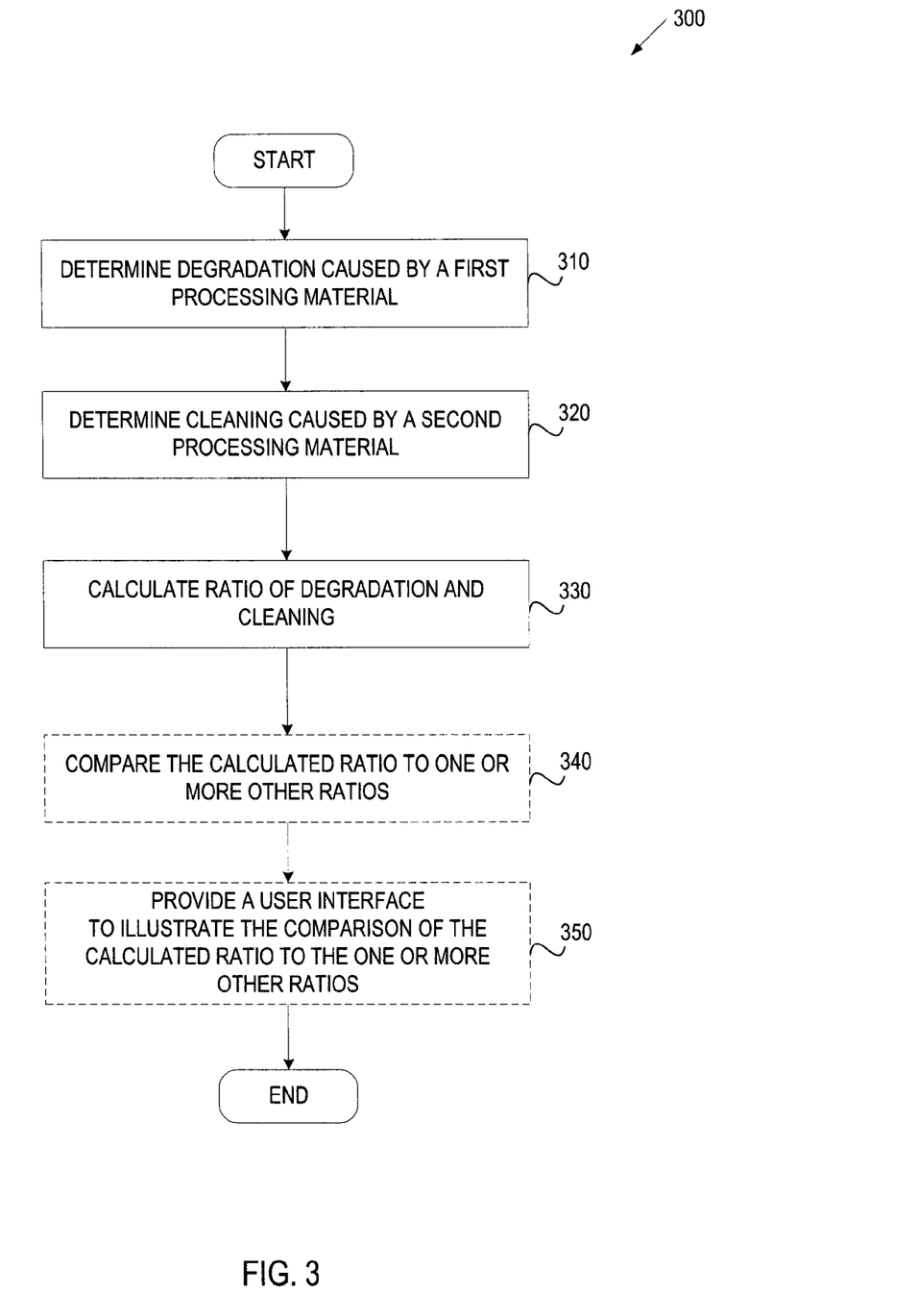
FIG. 3 illustrates an embodiment of a method for optimizing chemical or gas usage.

FIG. 3 illustrates one embodiment of a method 300 for identifying resources for optimization. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the resource usage optimization apparatus 205 of FIG. 2.

At block 310, processing logic determines a degradation caused by a first processing material. The first processing material, or resource, may be used in one or more processing steps in one or more processes (recipes) performed by one or more manufacturing tools. The first processing material affects or degrades a process chamber in the manufacturing tool in which the first processing material is used. Processing logic can determine the degradation caused by a first processing material by collecting an amount of the first processing material used in the processing steps for a process and calculating the degradation caused by the amount of the first processing material. In one embodiment, a GUI is provided to a user for the user to select the first processing material that the user would like to analyze. Processing logic can provide the GUI on a display device coupled to the processor (e.g., output device 275 in FIG. 2) according to one embodiment. In another embodiment, processing logic can generate GUIs and one or more client machines (e.g., client machines 270 in FIG. 2) can render the GUIs via a browser. FIG. 4, described in greater detail below, illustrates an exemplary GUI for illustrating the processing materials available for selection. In one embodiment, the degradation is calculated as a function of the amount of the first processing material. In this embodiment, the function can be a linear function, or any other more complex function. In an alternate embodiment, the degradation is calculated to be equivalent to the amount (volume) of the first processing material used. In one embodiment, the first processing material is a first reactant added to the process chamber. For example, the first processing material is a film that is deposited on semiconductor wafers using Chemical Vapor Deposition. As a result, the film is also deposited in the process chamber in which the semiconductor wafers are manufactured.

At block 320, processing logic determines a cleaning caused by a second processing material. The second processing material, or processing material, may be used in one or more processing steps in one or more processes performed by one or more manufacturing tools. The second processing material cleans a process chamber in the manufacturing tool in which the first processing material is used. Processing logic can determine the cleaning caused by the second processing material by collecting an amount of the second processing material used in the processing steps for a process and calculating the cleaning caused by the amount of the second processing material. In one embodiment, a GUI is provided to a user for the user to select the second processing material that the user would like to analyze. Processing logic can provide the GUI on a display device coupled to the processor (e.g., output device 275 in FIG. 2) according to one embodiment. In another embodiment, processing logic can generate GUIs and one or more client machines (e.g., client machines 270 in FIG. 2) can render the GUIs via a browser. FIG. 4, described in greater detail below, illustrates an exemplary GUI for illustrating the processing materials available for selection. In one embodiment, the cleaning is calculated as a function of the amount of the second processing material. In this embodiment, the function can be a linear function, or any other more complex function. In an alternate embodiment, the cleaning is calculated to be equivalent to the amount (volume) of second processing material used. In one embodiment, the second processing material is a second reactant added to the process chamber. For example, the second processing material is a cleaning gas, such as nitrogen tri-fluoride (NF3) used to clean or recondition the process chamber containing the film deposited by the first processing material.

At block 330, processing logic calculates a ratio of the degradation and the cleaning. Processing logic can calculate the ratio by performing an arithmetic operation on the amount of cleaning and the amount of degradation. In particular, processing logic can divide the amount of cleaning by the amount of degradation to determine a ratio of the usage of the second processing material (e.g., cleaning gas) to the usage of the first processing material (e.g., deposition film).

At block 340, processing logic compares the calculated ratio to one or more other ratios. In one embodiment, the calculated ratio is compared to a mean value of ratios. In this embodiment, the mean value of ratios is an average value of stored ratios. In an alternate embodiment, the calculated ratio is compared to a value representing a best known value of the ratio for the process run by the current process chamber. In another alternate embodiment, the calculated ratio is compared to a value representing a best known value of the ratio for the process run by any process chamber of the same type as the current process chamber. In one embodiment, the ratios used to calculate the mean can be ratios from other process chambers running the same process as the process chamber used to generate the current ratio. In an alternate embodiment, the ratios used to calculate the mean can be ratios from previous processes run by the same process chamber used to generate the current ratio. In one embodiment, the calculated ratio is stored and used to update the mean value of ratios and/or the best known value of the ratio. The revised ratios can set new targets for the resource usage ratios. Thresholds (limits) can be established based on the revised ratios. A threshold is a test that determines whether a ratio falls within a desired range. The thresholds can be monitored for specific processes or process chambers (tools).

In one embodiment, once the calculated ratio is compared to one or more other ratios, processing logic can detect whether a deviation exists between the calculated ratio and the one or more other ratios. In particular, processing logic can detect whether the calculated ratio is greater the one or more other ratios. If a deviation is detected, processing logic can further compare the deviation to a threshold to determine whether further analysis is required for the particular process or process chamber. The threshold can be a user-defined threshold, a baseline, a benchmark, a user-defined limit, or a limit generated based on ratio data collected over time. A ratio having a deviation that is greater than (or greater than or equal to) the threshold may be a process or process chamber whose usage of resources warrants analysis. In one embodiment, if the ratio has a deviation that is greater than (or greater than or equal to) the threshold, processing logic can send an alert to a user (e.g., engineer) that the ratio (and usage of the first and second resources) must be optimized. A ratio having a deviation that is less than (or less than or equal to) the threshold may be a ratio whose usage of resources does not warrant further analysis.

In one embodiment, at block 350, processing logic generates and provides a GUI to illustrate a comparison of the calculated ratio calculated at block 330 to one or more other ratios. Processing logic can provide the GUI on a display device coupled to the processor (e.g., output device 275 in FIG. 2) according to one embodiment. In another embodiment, processing logic can generate GUIs and one or more client machines (e.g., client machines 270 in FIG. 2) can render the GUIs via a browser. FIGS. 5A-5C, described in greater detail below, illustrate exemplary GUIs for illustrating a comparison of the calculated ratio to one or more other ratios. A user (e.g., an engineer) can perform resource usage optimization analysis of the processes, tools, and/or systems consuming the first resource and second resource based on the ratios identified in the GUI.

FIG. 4 illustrates an exemplary GUI 400 for selection of one or more resources, which can be generated by GUI generator 240 of FIG. 2, according to one embodiment of the invention. GUI 400 illustrates the various resources (e.g., chemicals, gases, etc.). In this example, GUI 400 illustrates the data 405 available for selection for a process performed by a process chamber. Data 405 includes a first processing material 410 and a second processing material 415 for a user to select in order to calculate a ratio of the usage of the first processing material and the usage of the second processing material.

FIG. 5A illustrates an exemplary GUI 500 to enable a comparison of ratios calculated for different tools, which can be generated by GUI generator 240 of FIG. 2, according to one embodiment of the invention. A user (e.g., an engineer) can use GUI 500 to analyze the process performed by the tools to optimize the usage of resources used by the process across the tools.

GUI 500 includes an x-axis 501 to represent the tool name and a y-axis 503 to represent a percentage ratio of usages. GUI 500 can include color to represent the data for each tool 501. In other embodiments, a GUI may use other visual indicators (e.g., different patterns, different shading, different shapes, etc.) to represent the data for each tool. GUI 500 illustrates a ratio of usage of a second processing material to usage of a first processing material for four tools (tool 1 505, tool 2 509, tool 3 513, tool 4 517), each running the same process using the same processing materials. GUI 500 shows tool 1 505 having a percentage ratio of usages 507 of one hundred percent (100%). Tool 1's usage of the first processing material is equivalent to tool 1's usage of the second processing material, thereby having the most efficient usage of the processing materials (minimal waste of the second processing material). Tool 2 509, tool 3 513, and tool 4 517 each have a percentage ratio of usages (511, 515, 519) that is higher than 100%. Therefore, the usage of the second processing material for tool 2 509, tool 3 513, and tool 4 517 is greater than the usage of the first processing material, resulting in a possible waste of the second processing material. A user may analyze or modify the amount of processing materials used by tool 2 509, tool 3 513, and tool 4 517 to optimize the usage of the processing materials such that the percentage ratio of usages are closer to 100%.

FIG. 5B illustrates an exemplary GUI 530 to enable a comparison of ratios calculated for different film thicknesses (first processing material) to best known values for one or more tools, which can be generated by GUI generator 240 of FIG. 2, according to one embodiment of the invention. A user (e.g., an engineer) can use GUI 530 to analyze the processes performed by the tools to optimize the usage of resources used for different film thicknesses.

GUI 530 includes an x-axis 531 to represent the film thickness and a y-axis 533 to represent a ratio of usages. GUI 530 can include color to represent the data for each film thickness

531. In other embodiments, a GUI may use other visual indicators (e.g., different patterns, different shading, different shapes, etc.) to represent the data for each film thickness. GUI 530 illustrates a ratio of usages of a second processing material to usage of a first processing material for different film thicknesses values (thickness values ranging from 2000 to 14000) for customer ratios of usage and best known methods (BKM) ratio of usages. For a film thickness of 2000 535, GUI 530 illustrates that some of the customer ratios of usages 537 for processes run by the customer are scattered away from the BKM ratio of usages 539 for those processes. A user may analyze the customer ratios of usages 537 to determine why certain runs of the process are closer to the BKM ratio of usages 539 than other runs. The user may make adjustments to the usages of processing materials accordingly. A user may further analyze the customer ratios of usages 537 to determine how to make the customer ratios of usages 537 closer to the BKM ratio of usages 539.

FIG. 5C illustrates an exemplary GUI 550 to enable a comparison of ratios calculated over time, which can be generated by GUI generator 240 of FIG. 2, according to one embodiment of the invention. A user (e.g., an engineer) can use GUI 550 to analyze the process performed by one or more the tools to optimize the usage of processing materials used over time for the process.

GUI 550 includes an x-axis 551 to represent time and a y-axis 553 to represent a ratio of usages. GUI 550 illustrates a ratio of usages 553 of a second processing material to usage of a first processing material over a range of time 551. At a time 555, the ratio of usages for the process has a value 557. The GUI 550 illustrates that at a time 559, the ratio of usages for the process has a value 561. A user may analyze the ratio of usage 557 and the ratio of usage 561 to determine why the process run at the time 555 had a higher value than the process run at the time 559.

Figure 6:
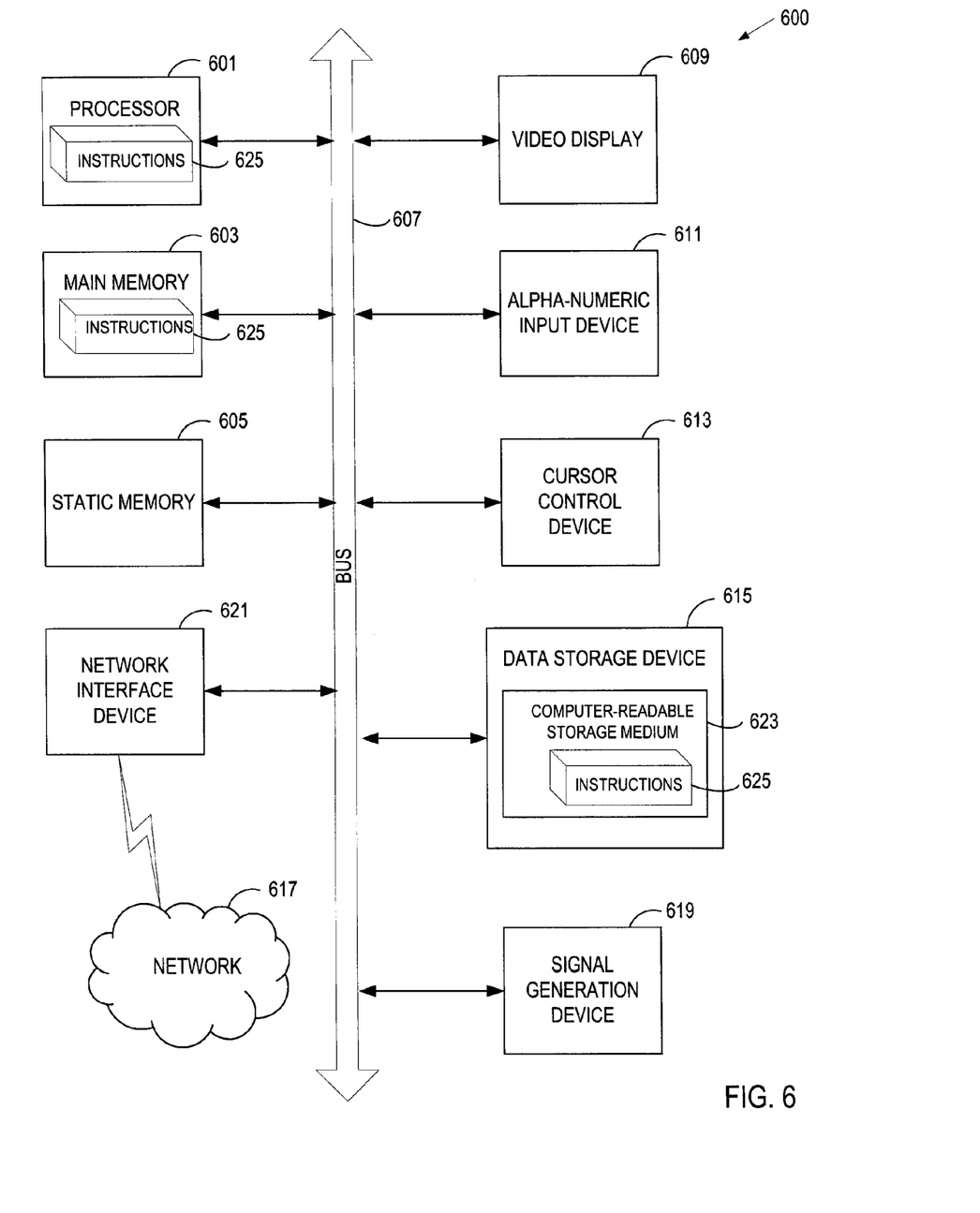
FIG. 6 illustrates an exemplary computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 601, a main memory 603 (e.g., read-only memory (ROM), flash memory, dynamic random access memory (DRAM) such as synchronous DRAM (SDRAM) or Rambus DRAM (RDRAM), etc.), a static memory 605 (e.g., flash memory, static random access memory (SRAM), etc.), and a data storage device 615 (e.g., drive unit), which communicate with each other via a bus 607.

Processor 601 represents one or more general-purpose processing devices such as a microprocessor, central processing unit, or the like. More particularly, the processor 601 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 601 may also be one or more special-purpose processing devices such as an application specific integrated circuit (ASIC), a field programmable gate array (FPGA), a digital signal processor (DSP), network processor, or the like. The processor 601 is configured to execute the instructions 625 for performing the operations and steps discussed herein.

The computer system 600 may further include a network interface device 621. The computer system 600 also may include a video display unit 609 (e.g., a liquid crystal display (LCD) or a cathode ray tube (CRT)), an alphanumeric input device 611 (e.g., a keyboard), a cursor control device 613 (e.g., a mouse), and a signal generation device 619 (e.g., a speaker).

The data storage device 615 may include a computer-readable storage medium 623 on which is stored one or more sets of instructions 625 (e.g., software) embodying any one or more of the methodologies or functions described herein. The instructions 625 may also reside, completely or at least partially, within the main memory 603 and/or within the processor 601 during execution thereof by the computer system 600, the main memory 603 and the processor 601 also constituting computer-readable storage media. The instructions 625 may further be transmitted or received over a network 617 via the network interface device 621.

The computer-readable storage medium 623 may also be used to store data structure sets that define user identifying states and user preferences that define user profiles. Data structure sets and user profiles may also be stored in other sections of computer system 600, such as static memory 605.

While the computer-readable storage medium 623 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories and optical and magnetic media.

It is to be understood that the above description is intended to be illustrative, and not restrictive. Many other embodiments will be apparent to those of skill in the art upon reading and understanding the above description.

What is claimed is:

1. A computer-implemented method comprising:
  determining, by a resource usage optimization server including a processing device, a degradation of a process chamber in a manufacturing tool caused by using a first processing material in the process chamber;
  determining, by the resource usage optimization server, a cleaning of the process chamber in the manufacturing tool caused by using a second processing material in the process chamber; and
  calculating, by the resource usage optimization server, a resource usage ratio of the degradation based on an amount of the first processing material used in the process chamber in comparison to the cleaning based on an amount of the second processing material used in the process chamber in the manufacturing tool.

2. The computer-implemented method of claim 1, wherein the resource usage ratio of the degradation based on an amount of the first processing material used in the process chamber in comparison to the cleaning based on an amount of the second processing material used in the process chamber in the manufacturing tool is calculated over time.

3. The computer-implemented method of claim 1, wherein determining the degradation of the process chamber in the manufacturing tool caused by the first processing material comprises:
   obtaining an amount of the first processing material used in one or more processing steps for a process; and
   calculating the degradation based on the amount of the first processing material.

4. The computer-implemented method of claim 1, wherein determining the cleaning of the process chamber in the manufacturing tool caused by the second processing material comprises:
   obtaining an amount of the second processing material used in one or more processing steps for a process; and
   calculating the cleaning based on the amount of the second processing material.

5. The computer-implemented method of claim 1, wherein calculating the resource usage ratio of the degradation and the cleaning comprises performing an arithmetic operation on the cleaning and the degradation, wherein the resource usage optimization server calculates a plurality of resource usage ratios associated with a plurality of process chambers with each resource usage ratio corresponding to the degradation in a process chamber in comparison to the cleaning in the process chamber in the manufacturing tool.

6. The computer-implemented method of claim 1, further comprising:
   calculating a deviation of the calculated resource usage ratio from a mean value or a predetermined value of a resource usage ratio; and
   determining if the deviation is greater than a predefined threshold.

7. The computer-implemented method of claim 6, further comprising:
   sending a notification if the deviation is greater than the predefined threshold.

8. The computer-implemented method of claim 6, wherein the calculated resource usage ratio is used to update the mean value or the predetermined value of the resource usage ratio.

9. A non-transitory computer-readable memory medium embodied with executable code that cause a processor to perform operations comprising:
   determining a degradation of a process chamber in a manufacturing tool caused by using a first processing material in the process chamber;
   determining a cleaning of the process chamber in the manufacturing tool caused by using a second processing material in the process chamber; and
   calculating a resource usage ratio of the degradation based on an amount of the first processing material used in the process chamber in comparison to the cleaning based on an amount of the second processing material used in the process chamber in the manufacturing tool.

10. The non-transitory computer-readable memory medium of claim 9, wherein the resource usage ratio of the degradation based on an amount of the first processing material used in the process chamber in comparison to the cleaning based on an amount of the second processing material used in the process chamber in the manufacturing tool is calculated over time.

11. The non-transitory computer-readable memory medium of claim 9, wherein determining the degradation of the process chamber in the manufacturing tool caused by the first processing material comprises:
   obtaining an amount of the first processing material used in one or more processing steps for a process; and
   calculating the degradation based on the amount of the first processing material.

12. The non-transitory computer-readable memory medium of claim 9, wherein determining the cleaning of the process chamber in the manufacturing tool caused by the second processing material comprises:
   obtaining an amount of the second processing material used in one or more processing steps for a process; and
   calculating the cleaning based on the amount of the second processing material.

13. The non-transitory computer-readable memory medium of claim 9, wherein calculating the resource usage ratio of the degradation and the cleaning comprises performing an arithmetic operation on the cleaning and the degradation.

14. The non-transitory computer-readable memory medium of claim 9, wherein the operations further comprise:
   calculating a deviation of the calculated resource usage ratio from a value of ratios; and
   determining if the deviation is greater than a predefined threshold.

15. The non-transitory computer-readable memory medium of claim 14, wherein the operations further comprise:
   sending a notification if the deviation is greater than the predefined threshold.

16. The non-transitory computer-readable memory medium of claim 14, wherein the calculated resource usage ratio is used to update the value of ratios.

17. A computerized system comprising:
   a processor coupled to a memory through a bus; and
   instructions executed from the memory by the processor to cause the processor to
   determine a degradation of a process chamber in a manufacturing tool caused by using a first processing material in the process chamber;
   determine a cleaning of the process chamber in the manufacturing tool caused by using a second processing material in the process chamber; and
   calculate a resource usage ratio of the degradation based on an amount of the first processing material used in the process chamber in comparison to the cleaning based on an amount of the second processing material used in the process chamber in the manufacturing tool.

18. The computerized system of claim 17, wherein the instructions further cause the processor to:
   calculate a deviation of the calculated resource usage ratio from a value of ratios; and
   determine if the deviation is greater than a predefined threshold.

19. The computerized system of claim 18, wherein the instructions further cause the processor to:
   send a notification if the deviation is greater than the predefined threshold.

20. The computerized system of claim 17, wherein to calculate the resource usage ratio of the degradation and the cleaning comprises performing an arithmetic operation on the cleaning and the degradation.

* * * * *